US012286945B2

(12) United States Patent
Mangeot et al.

(10) Patent No.: US 12,286,945 B2
(45) Date of Patent: Apr. 29, 2025

(54) HYBRID PROPULSION UNIT FOR SPACE VEHICLE

(71) Applicant: HYBRID PROPULSION FOR SPACE, Talence (FR)

(72) Inventors: Alexandre Mangeot, Talence (FR); Sylvain Bataillard, Talence (FR); Vincent Rocher, Talence (FR); Alexis Azoulai, Talence (FR)

(73) Assignee: HYBRID PROPULSION FOR SPACE, Talence (FR)

( * ) Notice: Subject to any disclaimer, the term of this patent is extended or adjusted under 35 U.S.C. 154(b) by 0 days.

(21) Appl. No.: 17/769,753

(22) PCT Filed: Oct. 16, 2020

(86) PCT No.: PCT/FR2020/051865
§ 371 (c)(1),
(2) Date: Apr. 17, 2022

(87) PCT Pub. No.: WO2021/074553
PCT Pub. Date: Apr. 22, 2021

(65) Prior Publication Data
US 2022/0381201 A1 Dec. 1, 2022

(30) Foreign Application Priority Data
Oct. 17, 2019 (FR) .................................... 1911634

(51) Int. Cl.
*F02K 9/72* (2006.01)
*B64G 1/40* (2006.01)
(Continued)

(52) U.S. Cl.
CPC ................ *F02K 9/72* (2013.01); *B64G 1/404* (2013.01); *F02K 9/44* (2013.01); *F02K 9/50* (2013.01);
(Continued)

(58) Field of Classification Search
CPC ... B64G 1/404; F02K 9/52; F02K 9/60; F02K 9/72; F02K 9/80; F02K 9/97
See application file for complete search history.

(56) References Cited

U.S. PATENT DOCUMENTS 3,017,748 A   1/1962  Burnside
3,214,906 A * 11/1965  Coleal ........................ F02K 9/72
                                                        60/257
(Continued)

FOREIGN PATENT DOCUMENTS

DE          4429860 A1 *  3/1995  ............... F02K 9/52
WO       2017142590 A1    8/2017

*Primary Examiner* — Kyle Robert Thomas
(74) *Attorney, Agent, or Firm* — H&I PARTNERS; Chai Im; C. Andrew Im (57) ABSTRACT

A hybrid propulsion unit, for a space vehicle or rocket, includes an external body defining a combustion chamber configured to receive a block of solid propellant, a pressurized reservoir configured to receive a liquid propellant, and a nozzle to eject the combustion gases produced by the reaction of the propellants. The pressurized reservoir being placed inside the external body, surrounded by the block of solid propellant. The propulsion unit further includes a plurality of liquid-propellant injectors disposed axially between parts of the solid propellant to improve the efficacy of the combustion. A space vehicle, of the launch vehicle type, equipped with such hybrid propulsion unit.

11 Claims, 7 Drawing Sheets

(51) Int. Cl.
*F02K 9/44* (2006.01)
*F02K 9/50* (2006.01)
*F02K 9/52* (2006.01)
*F02K 9/60* (2006.01)
*F02K 9/97* (2006.01)

(52) U.S. Cl.
CPC .................. *F02K 9/52* (2013.01); *F02K 9/60* (2013.01); *F02K 9/97* (2013.01)

(56) References Cited

U.S. PATENT DOCUMENTS

| | | | |
|---|---|---|---|
| 3,274,771 A | | 9/1966 | Lieberman et al. |
| 3,325,998 A | | 6/1967 | Novotny |
| 3,529,420 A | * | 9/1970 | Pierre ........................ F02K 9/58 251/44 |
| 3,806,064 A | * | 4/1974 | Parilla ...................... F42B 15/01 244/171.1 |
| 3,888,419 A | * | 6/1975 | McCullough .............. F02K 9/84 239/265.19 |
| 5,010,730 A | * | 4/1991 | Knuth ........................ F02K 9/72 60/262 |
| 5,101,623 A | * | 4/1992 | Briley ........................ F02K 9/72 239/553 |
| 8,539,753 B2 | * | 9/2013 | Macklin ..................... F02K 9/72 60/253 |
| 2011/0005193 A1 | * | 1/2011 | Pavia ...................... F02K 9/972 60/206 |

\* cited by examiner

HYBRID PROPULSION UNIT FOR SPACE VEHICLE

RELATED APPLICATIONS

This application is a § 371 application of PCT/FR2020/051865 filed Oct. 16, 2020, which claims priority from French Patent Application No. 1911634 filed Oct. 17, 2019, each of which is incorporated herein by reference in its entirety.

TECHNICAL FIELD

The present invention belongs to the general field of aerospace hybrid propulsion, in particular the architecture of hybrid rocket engines, and relates more particularly to a hybrid propulsion system (or propulsion unit) intended mainly for space vehicles and spacecrafts such as launch vehicles.

The present invention finds a direct application in the astronautical field.

BACKGROUND OF THE INVENTION

So-called hybrid space propulsion consists of using both solid propellants and liquid propellants, in order to combine their advantages while reducing the effects of their individual drawbacks. The principle of this technology dates from the 1930s but the first tests were carried out by the American Army in the 1950s. The patent document U.S. Pat. No. 3,274,771 A describes for example one of the first hybrid propulsion systems. Solid-liquid hybrid propulsion is characterised by the use of a solid fuel, or propellant, and a liquid oxidant. In rare cases, this configuration is reversed with a liquid propellant and a solid oxidant. The advantage of hybrid propulsion stems from its simplicity compared with the complex architectures of liquid propulsion, but also because the thrust can be modulated by varying the supply of liquid oxidant, unlike solid propulsion.

Fairly abundant literature extols the potential of hybrid propulsion, but also emphasises the operational limits of this technology which, at the present time, form an obstacle to its development on a larger scale.

In the 1990s, inconclusive research was carried out by the company Amroc on high-power hybrid rocket engines.

In fact, SpaceShipOne was the first space aircraft (2004) to use hybrid propulsion. Since then, hybrid propulsion has remained confined to a few niche applications such as SpaceShip which, with a view to transporting passengers in suborbital flights, sees a considerable safety advantage therein (the propellants used are not explosive) and a possibility of reducing costs.

As a general rule, in a hybrid propulsion unit, a liquid oxidant (LOX, $N_2O$, $H_2O_2$, etc.) is injected into a combustion chamber containing a solid reducing agent (polymers, paraffins, etc.). The reaction of these two species generates combustion that produces the energy necessary for propulsion, in a comparable manner to the operation of a solid-propellant or liquid-propellant propulsion unit.

According to this principle, it is possible to obtain high thrusts which, what is more, can be modulated by adjusting the flow rate of injected oxidant. Furthermore, and through the choice of certain chemical species, hybrid propulsion can have a non-toxic and/or non-pyrotechnic character.

However, this propulsion has drawbacks related to the limited performances of the materials available, in particular the low rates of consumption of current reducing agents, making use thereof unsuitable in vehicles requiring high thrust, such as launch vehicles.

Figure 1A:
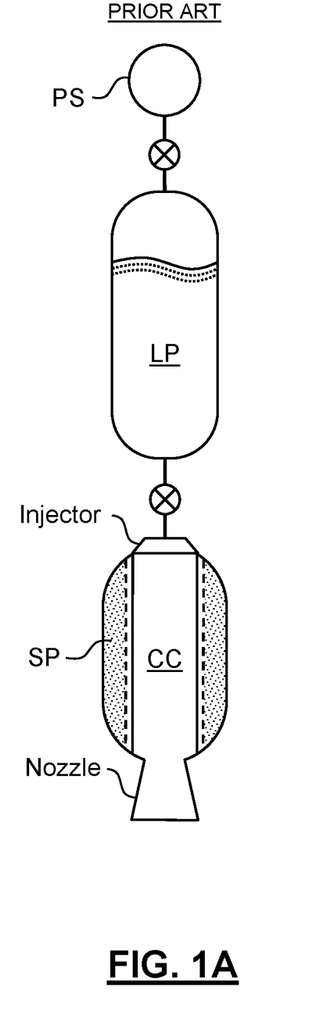
FIG. 1A: a schematic view of a hybrid propulsion unit according to the prior art.
Figure 1B:
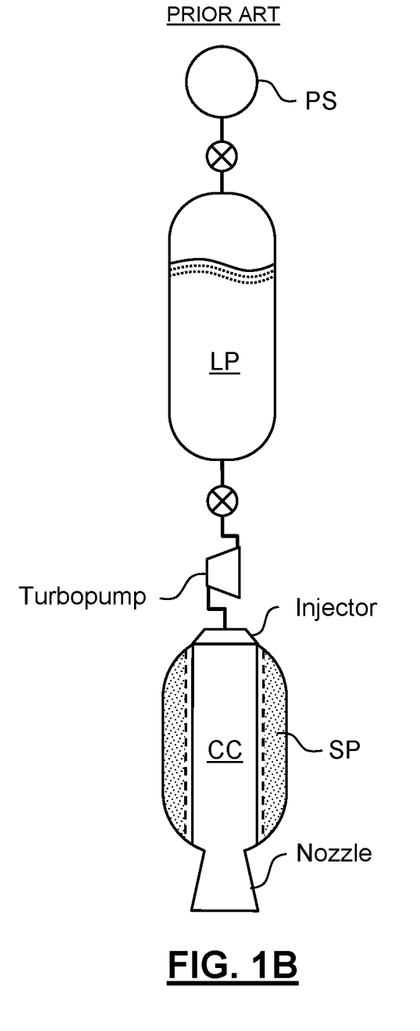
FIG. 1B: the propulsion unit of FIG. 1A equipped with a turbopump admitting liquid propellant.

The usual architecture of the majority of known hybrid propulsion units, shown schematically in FIGS. 1A and 1B, comes up firstly against a lack of compactness and volumetric efficiency because of the distance between the liquid-propellant reservoir and combustion chamber, and secondly against more critical phenomena of shaking. The patent document WO 2017/142590 responds to these problems by describing a rocket engine architecture wherein the liquid-propellant reservoir is placed, entirely or partially, in the combustion chamber defined by the solid propellant.

Despite this compact architecture, the injection of liquid propellant remains very localised in the combustion chamber and does not make it possible to obtain an optimum mixing of the gaseous chemical species resulting from the two propellants.

This mixing problem is amplified when the combustion chamber is large, and the existing hybrid propulsion systems cannot therefore be used in large-scale space applications. This is due to the fact that the turbulent structures that form in the gaseous flow do not change scale with the size of the combustion chamber. Consequently, the combustion zone is placed further from the combustion surface of the solid propellant in a large combustion chamber than in a small one. So that a large combustion chamber is less effective than a small combustion chamber.

Because of a non-optimum mixing in the current hybrid propulsion units, the energy released by the combustion remains below a maximum value corresponding to an optimum mixing, with part of the reagents ejected from the propulsion unit without having reacted and therefore without having released energy. Because of this, the efficiency and thereby the performance of the propulsion unit are appreciably inferior to their theoretically achievable values.

Moreover, the heat released by the combustion is less well transferred to the solid propellant for the aforementioned reasons. However, this heat transferred to the solid propellant determines the rate of consumption of said propellant, referred to as the regression rate, represented by solid arrows in FIG. 2. This is because, the greater the heat transferred to the solid propellant, the more rapidly is the latter consumed. The thrust of the propulsion unit being partly dependent on this regression rate, maximisation of the latter is desirable for high-power applications.

For these many reasons, no solution, to the knowledge of the applicant, makes it possible to use a hybrid propulsion system of sufficient size to, among other things, propel a space vehicle until it reaches an extra-atmospheric orbit.

OBJECT AND SUMMARY OF THE INVENTION

The present invention aims to overcome the drawbacks disclosed above and to respond to the technical problems relating thereto.

For this purpose, the object of the present invention is a hybrid propulsion unit, in particular for a space vehicle or rocket, comprising an external body in which a solid propellant is stored, extending in a longitudinal direction X of the external body, a pressurised reservoir containing a liquid or gaseous propellant, and a nozzle for ejecting the gases produced from the combustion of the propellants. This propulsion unit is remarkable in that it includes a plurality of liquid- or gaseous-propellant injectors arranged axially between parts of the solid propellant, and in that said solid propellant comprises at least one hollow cylindrical block.

According to one embodiment, the injectors are arranged along an internal surface of the solid propellant.

According to a particularly advantageous embodiment, the pressurised reservoir is placed inside the external body, surrounded by the solid propellant, and the injectors are disposed along and around said reservoir.

Thus, this proximity of the injectors to the solid propellant makes it possible to provide a large quantity of liquid propellant all along the combustion chamber formed by the channel between the internal surface of the solid propellant and the pressurised reservoir, so as to keep the combustion zone close to the internal (combustion) surface of the solid propellant independently of the size (diameter and length) of the propulsion unit.

More particularly, the injectors are disposed uniformly in longitudinal rows, along a longitudinal axis of the pressurised reservoir, and in radial rows with respect to said longitudinal axis, the radial rows being equidistant.

Advantageously, the external body and the pressurised reservoir are coaxial.

According to one embodiment, the liquid or gaseous propellant contained in the pressurised reservoir is sent into the injectors via a flow-rate control device, of the valve type, and pipes connecting the injectors or via a double wall of the pressurised reservoir.

The pipes may be in contact with the walls of the pressurised reservoir and serve as a cooling system for them by conveying a cryogenic liquid propellant for example.

According to an advantageous embodiment, the nozzle is of the aerospike type and includes a solid central body of the pressurised reservoir and an annular body, surrounding the central body, secured to the external body of said propulsion unit.

Advantageously, the central body of the nozzle is connected to the pressurised reservoir by means of a swivel and/or slider connection and actuators, of the jack type, so as to make it possible to manoeuvre said nozzle by modifying the cross section of its neck and/or the inclination of said central body with respect to said longitudinal axis.

Advantageously, the pressurised reservoir is secured to the external body by means of connecting rods at its bottom end, said connecting rods being arranged radially with respect to a longitudinal axis of said reservoir.

According to an alternative embodiment, the pressurised reservoir is mounted so as to be able to move in the external body by means of at least one jack at its bottom end and elastic connections at its top end opposite to said bottom end. The jack or jacks are for example pneumatic jacks operating by means of the surplus gas pressurising the pressurised reservoir.

Even more particularly, each jack is arranged radially around the longitudinal axis X of the external body and connects said external body to an upper part of the central body of the nozzle, so as to make it possible to manoeuvre said nozzle by modifying the cross section of its neck and/or the inclination of said central body with respect to said longitudinal axis.

These jacks for keeping the pressurised reservoir and the central body of the nozzle in position make it possible to modify the form (eccentricity) of the nozzle neck. This modification makes it possible to orient the thrust and therefore to control the propulsion unit. The jacks furthermore make it possible to modify the cross section of the nozzle neck to adapt the degree of expansion of the nozzle during the operation of the propulsion unit.

With regard to the chemical nature of the propellants, the solid propellant may be based on a polymer or a paraffin wax, and the liquid propellant may be cryogenic liquid oxygen (LOX), hydrogen peroxide ($H_2O_2$) or nitrogen monoxide ($N_2O$).

Another object of the invention is a space vehicle, of the launch vehicle type, including a hybrid propulsion unit as has been presented.

The fundamental concepts of the invention just having been disclosed above in their most elementary form, other details and features will emerge more clearly from the reading of the following description with regard to the accompanying drawings, giving by way of non-limitative example an embodiment of a hybrid propulsion unit in accordance with the principles of the invention.

BRIEF DESCRIPTION OF THE DRAWINGS

The various figures and the elements of one and the same figure are not necessarily shown to the same scale. In all the figures, the identical or equivalent elements bear the same numerical reference.

There are thus illustrated in.

DETAILED DESCRIPTION OF EMBODIMENTS

In the embodiment described below, reference is made to a "hybrid" propulsion system intended mainly for space vehicles and rockets. This non-limitative example is given for better understanding of the invention and does not exclude the use of the propulsion system in tactical missiles, military airborne drones and any other adapted vehicle.

In the remainder of the description the term "propulsion unit" designates by extension a space propulsion unit, also referred to as a rocket propulsion unit or rocket engine, and more exactly a space propulsion system, and the expression "hybrid propulsion unit" designates a hybrid space propulsion system of the solid propellant and liquid propellant type.

Figure 2:
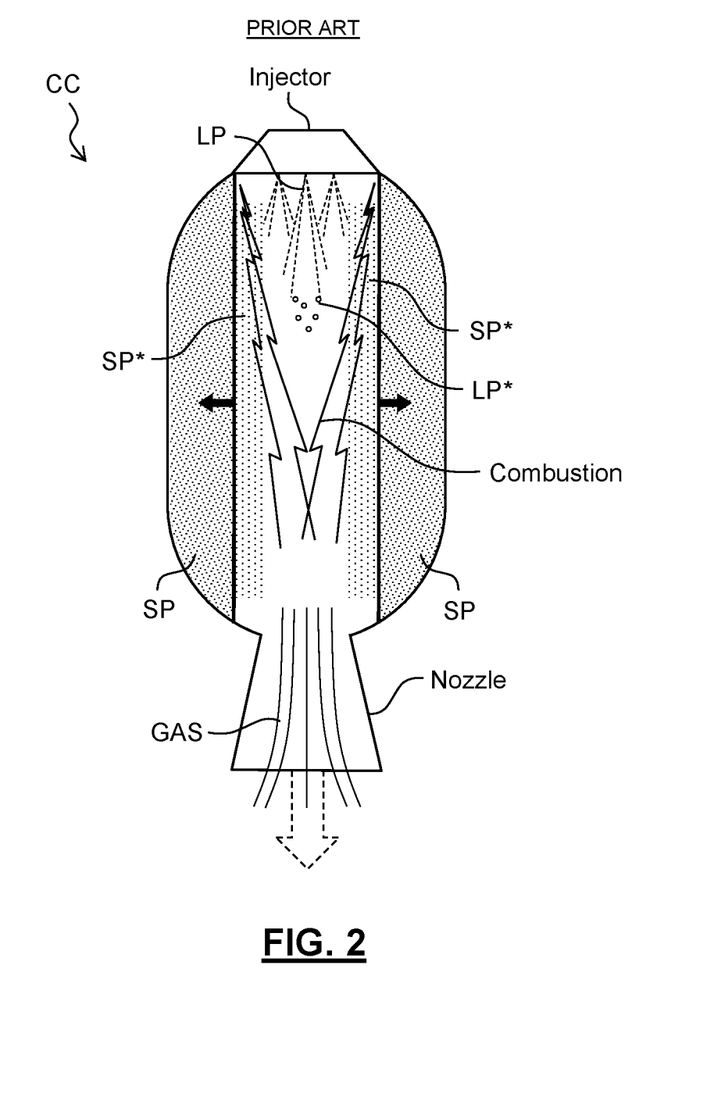
FIG. 2: a schematic view of the combustion chamber of the hybrid propulsion unit of the prior art in operation.

It is important to state that the hybrid propulsion units of the prior art, with reference to FIGS. 1A, 1B and 2, include in a simplified fashion a reservoir of liquid propellant LP pressurised by a pressurisation system PS and a combustion chamber CC storing a solid propellant SP, the internal surface of which delimits a combustion space, and terminating in a nozzle for ejecting the combustion gases giving rise to the thrust necessary for propulsion. The liquid propellant is pushed into the combustion chamber, passing through a valve controlling the flow rate and an injector that atomises the liquid propellant into a spray, as shown schematically on FIG. 2. When the pressure in the reservoir of liquid propellant does not exceed the pressure prevailing in the combustion chamber, a turbopump can be used for more pressure, as shown on FIG. 1B. In the combustion chamber in operation shown schematically in FIG. 2, the droplets of liquid propellant injected produce, in response to the local temperature, gaseous chemical species LP*. Likewise, the solid propellant produces gaseous chemical species SP*. These gaseous chemical species next mix in the combustion chamber and react highly exothermically to produce new chemical species until one of the propellants is exhausted. This combustion can be initiated by an external heat source such as a pyrotechnic igniter, an electric arc, a laser, etc., or by spontaneous exothermic decomposition of the liquid propellant under the effect of a catalyst.

Figure 3:
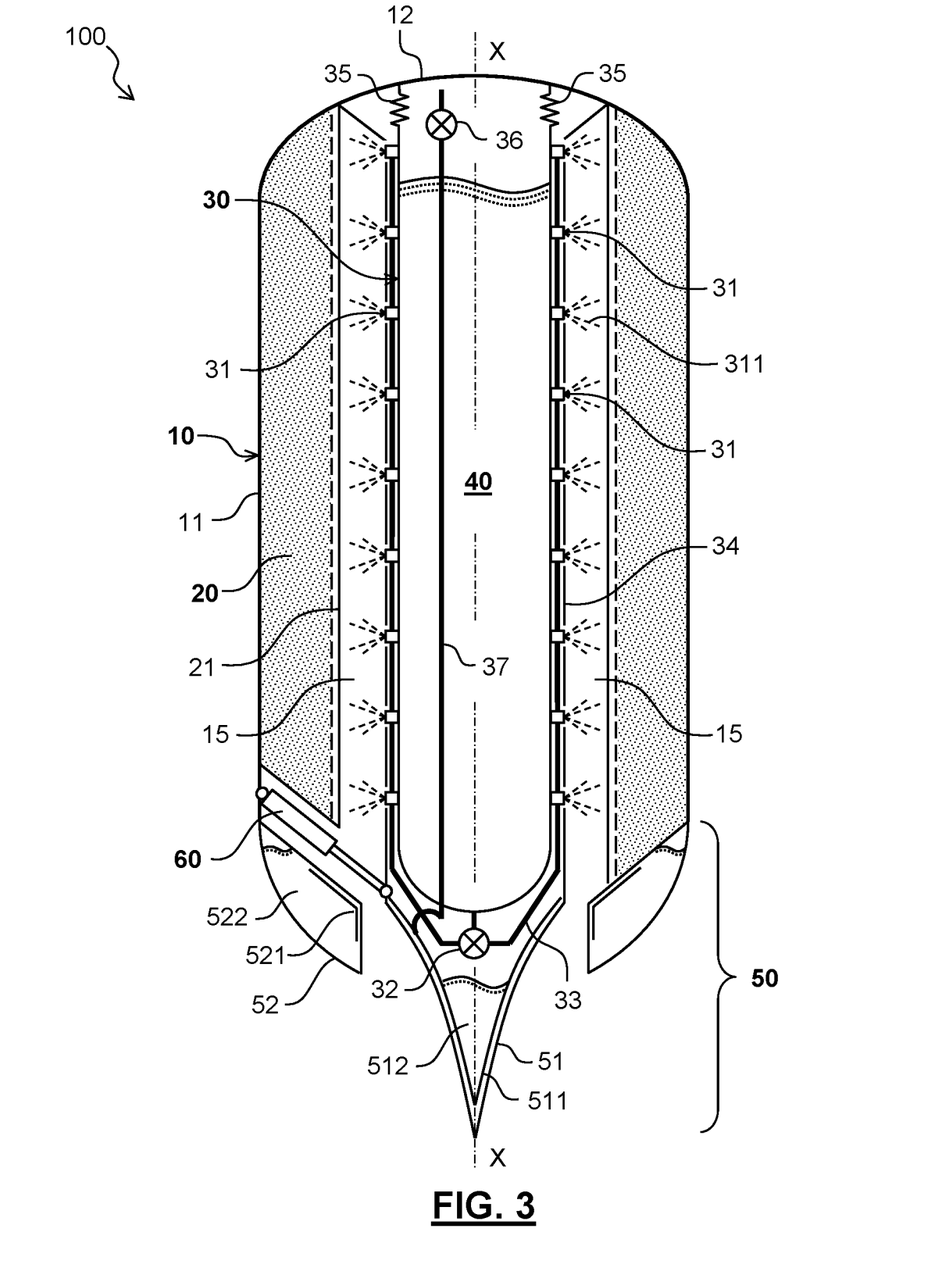
FIG. 3: a view in schematic cross section of a hybrid propulsion unit according to one embodiment of the invention.

FIG. 3 shows a hybrid propulsion unit 100 according to the invention, comprising mainly an external body 10, intended to receive a solid propellant 20 that defines a combustion chamber 15, a pressurised central reservoir 30 intended to receive a liquid propellant 40, said reservoir being placed inside the external body and extending along a longitudinal axis X thereof, and a nozzle 50 for discharging the combustion gases, mounted articulated on the external body 10 by means of jacks 60.

The external body 10, according to the embodiment illustrated, has the form of a roughly cylindrical cavity with a circular base, and more precisely includes a cylindrical lateral wall 11 and a slightly curved upper end wall 12, lenticular in form for better mechanical strength in the face of the pressures in the combustion chamber. In addition, and for obvious reasons of aerodynamic performance and size, the external body 10 has an elongate shape along the longitudinal axis X, thus reducing drag (in atmospheric flight) while allowing storage of a large quantity of solid propellant 20.

The solid propellant 20, according to the embodiment illustrated, is in the form of a block, which may be in a single piece (monobloc) or obtained by superimposing a plurality of blocks, having a form and dimensions adapted for being stored in the external body 10. This is because the block of solid propellant 20 is hollow in form and includes an external surface the form of which matches that of the external body 10 and an internal surface 21 with any form, as emphasised below, provided that it allows the arrangement of other elements of the propulsion unit 100, in particular of the central reservoir 30, the axial arrangement of which is essential in the context of the present invention.

The internal surface 21 of the block of solid propellant 20 furthermore delimits the combustion chamber 15, the volume of which increases as said block is consumed during combustion.

The solid propellant 20 may be based on a polymerised material or a thermoplastic material such as a fast-combustion paraffin wax. For example, the solid propellant 20 is hydroxytelechelic polybutadiene (HTPB), a derivative of HTPB, or polyoxymethylene (POM).

The solid propellant 20 may also include metal additives such as aluminium, magnesium, lithium or beryllium that increase the specific propulsion of the propulsion unit, in other words the speed of the gases ejected.

The central reservoir 30, according to the embodiment illustrated, is arranged coaxially inside the external body 10, has a cylindrical tubular shape with a circular base, open at its top end and closed by a hemispherical bottom, and includes a plurality of injectors 31 distributed along and around said reservoir, a device for controlling the flow rate of liquid propellant 32, a network of pipes 33 supplying the injectors 31, thermal protections 34 and elastic connections 35 by which the central reservoir is attached to the external body 10.

The central reservoir 30 is intended to contain the liquid propellant 40 or, according to an alternative embodiment, a gaseous propellant, and therefore requires to be pressurised. For this purpose, the central reservoir 30 is provided with an adapted pressurisation system, with liquid helium for example, or using the liquid propellant as indicated below, comprising for example a device 36 for controlling the pressurisation, of the valve type, as well as a pressurisation channel 37 shown schematically on FIG. 3.

With regard to the chemical nature of the liquid propellant 40, this may be cryogenic liquid oxygen (LOX), hydrogen peroxide ($H_2O_2$), nitrogen monoxide ($N_2O$), or any other adapted liquid propellant.

The injectors 31, according to the embodiment illustrated, are distributed radially along and around the central reservoir 30, or more precisely on an external surface of said reservoir, so as to allow the most effective possible injection, in the combustion space, reaching almost all the combustion surface of the block of solid propellant 20 (which is also its internal surface 21). For this purpose, the injectors 31 are disposed in longitudinal rows, over a major part of the length of the central reservoir 30, and in cross sections of said reservoir, preferably equidistant. The injectors 31 may also be inclined with respect to the transverse planes of the central reservoir 30.

It is important to note that the location of the injectors 31 depends on the form of the cross section of the central reservoir 30, circular or polygonal, on the form of the internal surface of the block of solid propellant 20 and on the intrinsic parameters of said injectors.

This is because the injectors 31, preferably identical, are characterised by the atomised liquid jet 311 (or spray) that occupies a portion of the space delimited by a not necessarily circular cone, the latter will be designated "solid injection angle". Taking into account this solid injection angle thus makes it possible to determine the optimum arrangement of the injectors 31 for a given configuration in terms of forms of the central reservoir 30, of the internal surface 21 of the block of solid propellant 20 and of the number of injectors that will be incorporated, so as to obtain a uniform injection over a major part of the block of solid propellant 20.

Figures 4, 4A, 5:
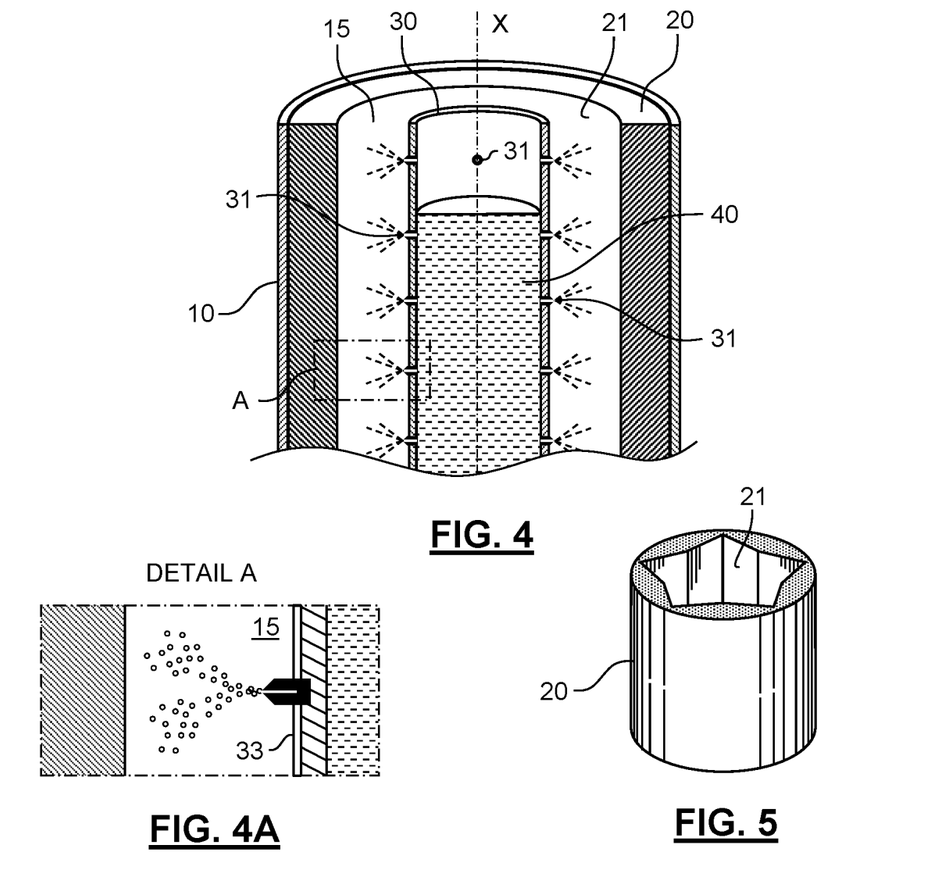
FIG. 4: a partial view in cross section and in perspective of a propulsion unit according to the invention, showing the arrangement of the external body, of the solid propellant, of the liquid-propellant reservoir and of the injectors.
FIG. 4A: a detail of FIG. 4 showing radial injection.
FIG. 5: an example of a form of a solid-propellant block that can be used in the propulsion unit according to the invention.

FIG. 4 shows the arrangement of the external body 10, of the block of solid propellant 20, here with a circular internal surface 21, of the central reservoir 30 and of the injectors 31. The detail in FIG. 4a illustrates the radial injection obtained by each injector, the injectors being supplied by the pipes 33.

Figure 6A:
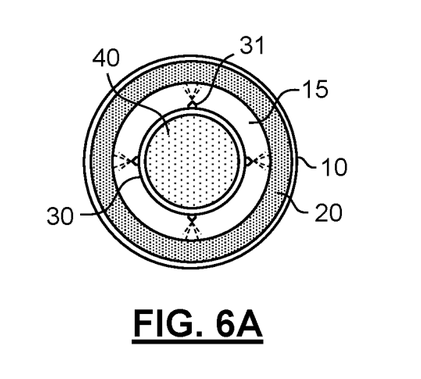
FIG. 6A: a cross section of a propulsion unit according to one embodiment.
Figure 6B:
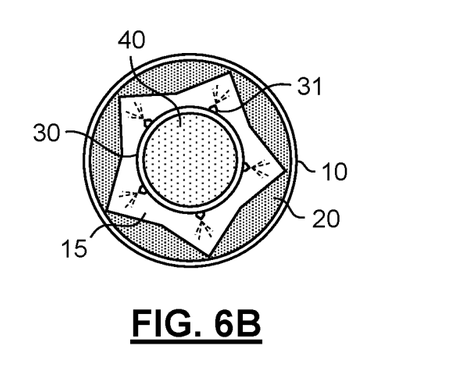
FIG. 6B: a cross section of a propulsion unit according to another embodiment, with the solid-propellant block of FIG. 5.

Examples of possible peripheral arrangements of the injectors 31 are given in FIGS. 6A and 6B, with respectively an arrangement in a square in the case of an annular block of solid propellant 20 and a regular polygonal arrangement, here in a pentagon, in the case of a block of solid propellant in a star, here with five arms.

It should be stated that the varied forms of the internal surface 21 of the block of solid propellant 20 make it possible to increase the combustion surface area for the same volume of solid propellant, this combustion surface area favouring heat transfer and improving the quality of combustion. Thus, the combination of a broadened internal surface of solid propellant and the distribution of the injectors makes it possible to appreciably increase the efficiency of combustion compared with the solutions of the prior art, while ensuring homogeneous distribution of the liquid propellant in the various cavities of the block of solid propellant (which is not the case in the prior solutions having multi-channel blocks and an upstream injector).

FIG. 5 shows a block of solid propellant 20 having an internal surface 21 in a star such as the one in FIG. 6B. The incorporation of this block in the propulsion unit is shown schematically by the exploded view in FIG. 7, which also shows the global symmetry of revolution of the propulsion unit according to the embodiment described.

The injectors 31 then make it possible to inject liquid propellant 40 into the combustion chamber 15 containing the solid propellant 20, the mixing of the two propellants producing a highly exothermic combustion that provides the energy necessary for the propulsion of a spacecraft equipped with the propulsion unit 100. The combustion is maintained as long as no solid propellant 20 or liquid propellant 40 is completely consumed. In addition, the ignition, the thrust modulation and the extinction of the propulsion unit 100 remain controllable by the quantity of liquid propellant injected into the combustion chamber provided that there is still solid propellant in said chamber.

The liquid propellant injected comes from the central reservoir 30, passing through the flow-rate control device 32, which is for example a valve placed under said reservoir, and through the supply pipes 33 that convey the pressurised liquid propellant to the injectors 31. The pipes 33 have for example thin walls, preferably made from copper alloy, lining the walls of the central reservoir 30 in order thus to constitute a convective cooling system, by means of the circulation of the liquid propellant (which may be cryogenic), for said reservoir subjected to the extreme temperatures of the combustion chamber 15.

Additional thermal protection is provided by the thermal protections 34 that cover a major part of the external surface of the central reservoir 30, said surface being immersed in the combustion chamber 15 while being in direct contact with the combustion gases. The thermal protections 34 consist for example of a specific cladding, tiles of heat-resistant material, or a layer of solid propellant.

According to an alternative embodiment that is not shown, the supply to the injectors is achieved through a double wall of the reservoir of liquid propellant.

The coaxial arrangement of the central reservoir 30 inside the block of solid propellant 20 advantageously enables the multiple injectors 31 to be facing and in proximity to said block so that the sprays 311 of liquid propellant effectively reach the combustion surface of the solid propellant, and this until the solid propellant is exhausted. In addition, this arrangement favours the formation of local turbulences maintained along the combustion chamber for improved mixing of the gases. The mixing of the gases obtained is such that the energy produced by the combustion tends to approach a theoretical maximum (obtained when there is complete reaction of the reagents). These combustion gases are next ejected through the nozzle 50 located at the end of the central reservoir 30 and of the external body 10.

The nozzle 50, according to the embodiment illustrated in FIG. 3, is of the long spike type, commonly referred to as aerospike, known for its performance, in particular its efficacy within a wide range of altitudes and its low consumption of fuel at low altitude, and includes a central body 51 surrounded by an annular body 52.

The central body 51 of this aerospike nozzle 50 can be attached as an extension to the central reservoir 30 by means of a junction member for example, or preferably manufactured in a single piece with a central body also containing said reservoir.

The central body 51 of the aerospike nozzle 50 has a conical shape, sometimes slightly in a truncated hyperboloid of revolution, defining a pipe that channels the jet of gas and which, consequently, must be cooled in operation. For this purpose, the central body 51 is provided with a cooling system 511 supplied by a cooling liquid 512 stored in a cavity delimited by said central body.

The cooling liquid 512, which may be of the same nature as the liquid propellant 40 or another chemical substance, may also serve, after vaporisation, to supply the pressurisation system 36 and 37 of the central reservoir 30.

According to an alternative embodiment that is not shown, the central body of the aerospike nozzle constitutes the bottom of the reservoir of liquid propellant so that the liquid propellant serves as a heat-transfer fluid for cooling said body. Thus, part of the fluid supplies the injectors so as to be injected into the combustion chamber and the other part, which is vaporised, is used by the pressurisation system.

The annular body 52 of the aerospike nozzle 50 for its part is located at the bottom end of the external body 10 of the propulsion unit and thus has an adapted form in continuity with said external body. The annular body 52 also defines ejection tubes for the gases and thereby requires being cooled in operation. This is achieved, as in the case of the central body 51, via a cooling system 521 supplied by a cooling system 522 stored in internal cavities of the annular body 52.

Furthermore, the annular body 52 of the nozzle can be attached to the external body 10 of the propulsion unit by adapted junction means, or preferably manufactured in a single piece with said external body for better aerodynamics and greater mechanical strength.

In the propulsion unit 100, according to the embodiment illustrated, the aerospike nozzle 50 has relative mobility with respect to the external body 10, through its central body 51 that is supported radially by at least one jack 60 itself making it possible to deviate substantially with respect to the longitudinal axis X of the propulsion unit. The central body 51 can be connected to the external body 10 by a plurality of jacks 60 uniformly distributed around said central body.

For example, the central body 51 of the nozzle is connected to the external body 10 by four jacks 60 arranged symmetrically so as to be able to point in various directions substantially inclined with respect to the longitudinal axis X.

The jacks 60 are for example pneumatic double-acting jacks supplied by the surplus pressurisation gas, itself coming from the vaporisations of the cooling liquids for the nozzle 50.

The central body 51 of the nozzle being secured to the central reservoir 30, the latter must have a certain degree of mobility with respect to the external body 10 of the propulsion unit to follow the movement of said central body. Because of this, the central reservoir 30 is attached to the external body 10 by means of elastic connection 35 that operate in an accordion to allow the elastic deformations of the central reservoir 30 in response to the movements of the central body 51 of the aerospike nozzle 50.

The movements of the central body 51 of the nozzle make it possible to modify the eccentricity of the cross section of the neck of the nozzle so as to orient the thrust during the operation of the propulsion unit 100.

Figure 10:
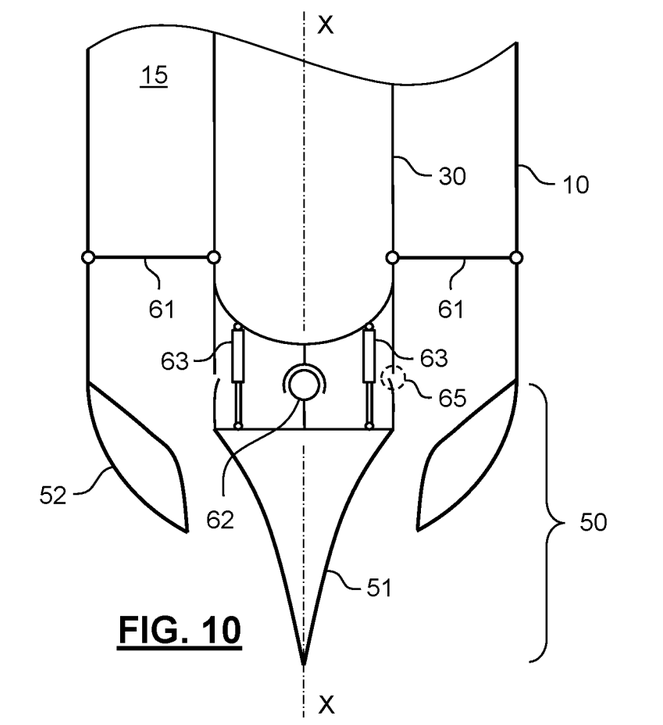
FIG. 10: a partial view in longitudinal section of a propulsion unit according to one embodiment, showing the connections between the external body, the reservoir of liquid propellant and the nozzle.

Preferably and according to the embodiment in FIG. 10, the central reservoir 30 is fixed with respect to the external body 10 while being centred and held at its lower part by connecting rods 61 adjustable for length and disposed radially between said reservoir and said external body; and the central body 51 of the aerospike nozzle 50 is connected to the central reservoir 30 by a swivel connection, or preferably a slider connection combined with a swivel connection 62, as well as by actuators 63 such as jacks.

The connecting rods 61 make it possible to adjust the centring of the central reservoir 30 during the final assembly of the propulsion unit, to take up any residual off-centring after manufacture or initial assembly.

A single swivel connection between the central body 51 of the nozzle and the central reservoir 30 makes it possible to modify the orientation of said body. On the other hand, a double slider-swivel connection makes it possible, in addition to the inclination of the central body 51, to adjust the cross section of the neck of the aerospike nozzle 50.

Figure 11:
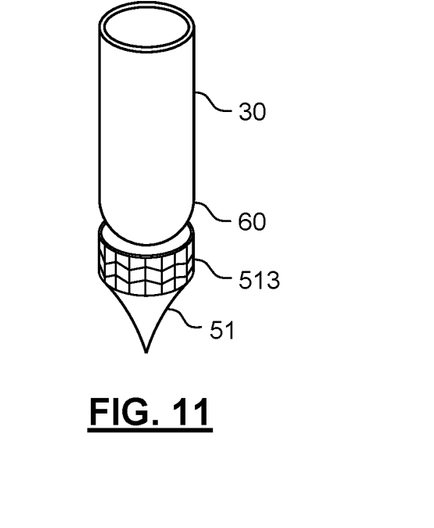
FIG. 11: an exploded view of the reservoir of liquid propellant and of the central body of the nozzle of a propulsion unit according to one embodiment, with a deformable wall surmounting said central body.

Furthermore, the junction between the central body 51 and the central reservoir 30 can be implemented by two annular metal parts 65 separated longitudinally from each other to allow their relative movement in response to the movement of the central body of the nozzle. Alternatively, and with reference to FIG. 11, this junction can be implemented by means of a flexible wall 513 that deforms in an accordion under the effect of the movements of the central body 51 of the aerospike nozzle 50.

Figures 7, 8, 9:
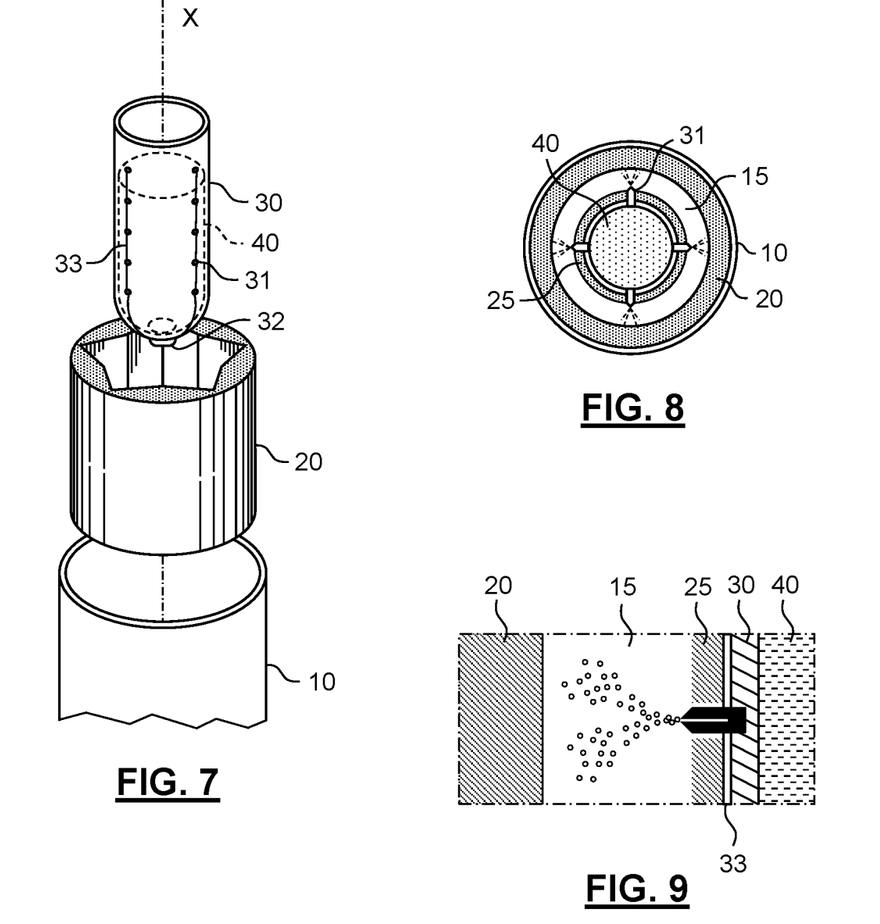
FIG. 7: an exploded partial view of a propulsion unit according to one embodiment.
FIG. 8: a cross section of a propulsion unit according to another embodiment, wherein the liquid-propellant reservoir is surrounded by a secondary block of solid propellant.
FIG. 9: a detail in longitudinal section of a propulsion unit according to the embodiment in FIG. 8.

According to the embodiment in FIGS. 8 and 9, the hybrid propulsion unit furthermore includes a secondary block of solid propellant 25 disposed in a layer around the central reservoir 30. Openings receiving the injectors 31 are provided in the block 25. This supplementary block makes it possible to produce more gaseous chemical species under the effect of the temperature of the combustion chamber, improving the mixing of the propellants even more.

Because of the invention, it is clear that minor modifications can be applied to the hybrid propulsion unit, and more particularly to the geometry and to the arrangement of the reservoir of liquid propellant and the injectors, without departing from the scope of the invention, the principal object of which is claimed below.

Figure 12:
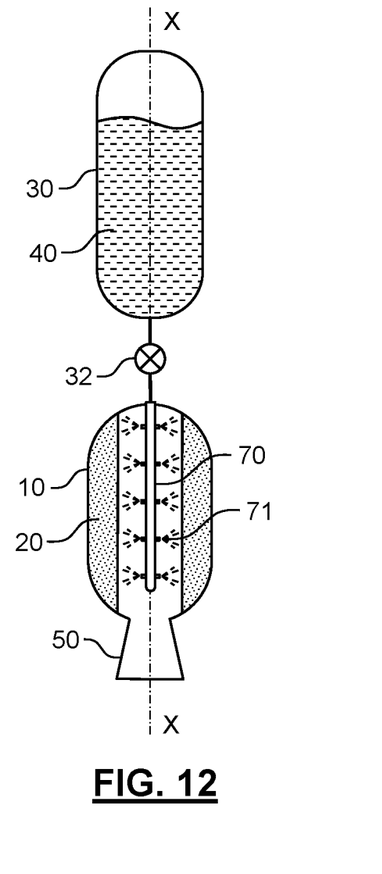
FIG. 12: a schematic view of a hybrid propulsion unit according to one embodiment wherein the reservoir of liquid propellant is outside the external body.

For example, FIG. 12 shows an alternative architecture according to the invention wherein the central reservoir 30 is placed outside the external body 10, while being connected to an injection system 70 provided with a plurality of injectors 71 and placed inside said external body, along the block of solid propellant 20.

Figure 13:
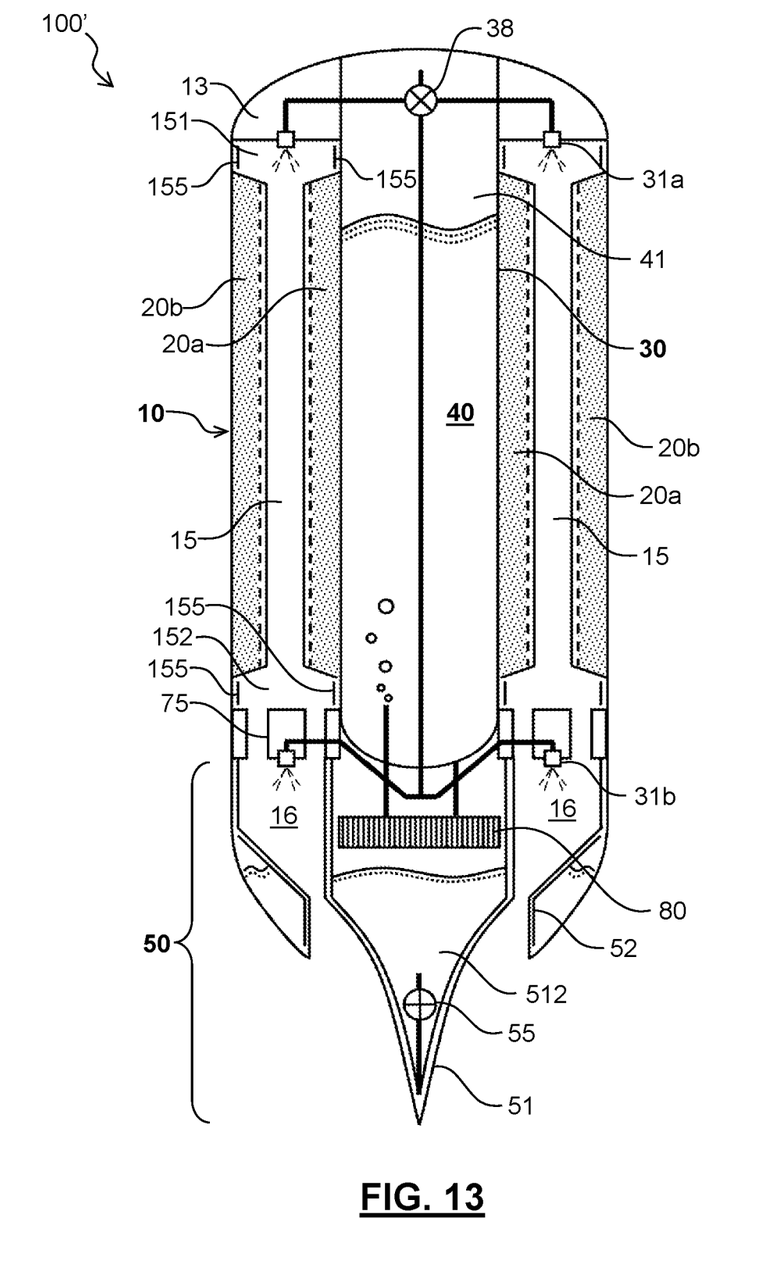
FIG. 13: a view in schematic cross section of a hybrid propulsion unit according to another embodiment of the invention.

FIG. 13 shows a hybrid propulsion unit 100' according to another embodiment, wherein the combustion chamber 15 has an annular shape with two slabs of solid propellant 20$a$ and 20$b$ attached respectively to an internal wall and an external wall of said chamber. The internal wall to which the first slab 20$a$ of solid propellant is attached delimits the central reservoir 30 of liquid propellant.

The liquid propellant 40 is self-pressurised by boiling, the heat necessary being provided by the heat-transfer fluid 512 that cools the walls of the nozzle 50 in accordance with a closed thermodynamic cycle.

According to this embodiment, the propulsion unit 100' comprises an injection dome 13 making it possible to provide gasified liquid propellant 41 coming from the top part of the reservoir 30 in the combustion chamber 15.

Thus, a rich-mixture combustion (excess of solid propellant and lack of liquid propellant) takes place in the combustion chamber 15 and vaporises the solid propellant without producing very hot combustion gases. The gases produced next pass through a bottom injection system 75 that provides the missing gasified liquid propellant for making the combustion complete. The mixing takes place in a combustion post-chamber 16 delimited by the walls of the nozzle 50.

Furthermore, the cylindrical slabs of solid propellant 20$a$ and 20$b$ thermally protect the walls of the combustion chamber to which they are attached.

According to the embodiment in FIG. 13, the combustion chamber 15 has upstream 151 and downstream 152 cavities without any solid propellant and therefore includes additional thermal protections 155.

The hybrid propulsion unit 100' comprises a heat exchanger 80 enabling the liquid propellant 40 to boil and therefore to self-pressurise within the reservoir 30.

The vaporised liquid propellant 41 supplies the combustion both in the combustion chamber 15 and in the combustion post-chamber 16. The supply to the top 31$a$ and bottom 31$b$ injectors is controlled by a flow-rate regulator and a two-way valve 38.

The bottom injection system 75 makes it possible to convey the gases coming from the combustion chamber 15 to the combustion post-chamber 16, to support a series of bottom injectors 31$b$ and to pass the cooling heat-transfer fluid 512 coming from the external walls to the heat exchanger 80, the latter being located at the centre of the propulsion unit below the reservoir 30 of liquid propellant.

The aerospike nozzle 50 is cooled by the circulation of the heat-transfer fluid in its double walls 51 and 52 (cooling systems). The heat-transfer fluid 512 transports the thermal energy by sensitive heat (heating) and optionally latent heat (vaporisation). The heat-transfer fluid is cooled in the heat exchanger and reinjected into its storage zone. A pump 55 can serve to force the heat-transfer fluid to make its cooling cycle.

Thus, the double slab of solid propellant multiplies by two the wetted surface area without making the geometry more complex (no multiple channels). The arrangement with the reservoir of oxidant inside makes it possible to obtain high compactness and a length to diameter ratio compatible with a launch stage application.

The slabs of solid propellant provide total thermal protection over the two walls (internal and external). The incomplete combustion in the combustion chamber also reduces the thermal stresses at the end of operation when the slabs of solid propellant are no longer thick enough to provide sufficient thermal protection.

The incomplete combustion also offers the possibility of obtaining a required or even optimum mixing ratio by virtue of the second injection of vaporised liquid propellant into the combustion post-chamber. This architecture is not affected by the shift in ratio of the mixing due to the opening of the channel of the combustion chamber.

Injecting vaporised liquid propellant avoids the combustion instabilities due to the liquid interactions (droplets) with the gases in the combustion chambers. The injectors are also less complex than if they had to inject a fluid in the liquid state.

The invention claimed is:

1. A hybrid propulsion unit, for a space vehicle or rocket, comprising an external body in which a solid propellant is stored; a pressurized reservoir, extending in a longitudinal direction of the external body, containing a liquid propellant; a nozzle to eject gases produced from a combustion of the propellants; at least one plurality of injectors located on an axis which is arranged axially, along the longitudinal direction, between parts of the solid propellant; a heat-transfer fluid; the solid propellant comprising at least one hollow cylindrical block; wherein the liquid propellant is self-pressurized by boiling with heat provided by the heat-transfer fluid; and wherein the at least one plurality of injectors provide a gasified liquid propellant.

2. The hybrid propulsion unit of claim 1, wherein the at least one plurality of injectors is arranged along an internal surface of the solid propellant.

3. The hybrid propulsion unit of claim 1, wherein the external body and the pressurized reservoir are coaxial.

4. The hybrid propulsion unit of claim 1, wherein the liquid propellant contained in the pressurized reservoir is sent into the at least one plurality of injectors via a flow-rate control device and pipes.

5. The hybrid propulsion unit of claim 1, wherein the nozzle is of the aerospike type and comprises a central body secured to the pressurized reservoir and an annular body secured to the external body of the hybrid propulsion unit.

6. The hybrid propulsion unit of claim 5, wherein the central body of the nozzle is connected to the pressurized reservoir by at least one of a swivel connection and a slider connection, and actuators, of a jack type, to maneuver the nozzle by modifying at least one of a cross section of a neck of the nozzle and an inclination of the central body with respect to a longitudinal axis.

7. The hybrid propulsion unit of claim 1, wherein the pressurized reservoir is attached to the external body by connecting rods at a bottom end of the pressurized reservoir, the connecting rods being arranged radially with respect to a longitudinal axis of the pressurized reservoir.

8. The hybrid propulsion unit of claim 1, wherein the solid propellant is based on a polymer or a paraffin wax, and the liquid propellant is cryogenic liquid oxygen, hydrogen peroxide or nitrogen monoxide.

9. An aerospace vehicle of the launch vehicle type, comprising the hybrid propulsion unit of claim 1.

10. A hybrid propulsion unit, for a space vehicle or rocket, comprising an external body in which a solid propellant is stored; a pressurized reservoir, extending in a longitudinal direction of the external body, containing a liquid propellant; a nozzle to eject gases produced from a combustion of the propellants; at least one plurality of injectors located on an axis which is arranged axially between parts of the solid propellant; a heat-transfer fluid; the solid propellant comprising at least one hollow cylindrical block; wherein the liquid propellant is self-pressurized by boiling with heat provided by the heat-transfer fluid; and wherein the at least one plurality of injectors provide a gasified liquid propellant; wherein the pressurized reservoir is placed inside the external body, surrounded by the solid propellant; and wherein the at least one plurality of injectors is disposed along and around the pressurized reservoir.

11. The hybrid propulsion unit of claim 10, wherein the at least one plurality of injectors is disposed uniformly in longitudinal rows, along a longitudinal axis of the pressurized reservoir, and in radial rows, with respect to the longitudinal axis, the radial rows being equidistant.

* * * * *